United States Patent
Kennedy et al.

[15] 3,702,471
[45] Nov. 7, 1972

[54] MEASURING APPARATUS

[72] Inventors: Christopher John Kennedy; Alexander Turnbull Shepherd; Graham Isaac Thomas, all of Edinburgh, Scotland

[73] Assignee: Ferranti, Limited, Hollinwood, Lancashire, England

[22] Filed: Jan. 5, 1971

[21] Appl. No.: 104,095

[30] Foreign Application Priority Data

Jan. 8, 1970    Great Britain..............902/70

[52] U.S. Cl. .......................340/347 P, 235/151.11
[51] Int. Cl. ..............................G08c 9/00
[58] Field of Search ...............340/347; 235/151.11

[56] References Cited

UNITED STATES PATENTS 3,461,449   8/1969   Baskin et al. ............340/347
3,531,798   9/1970   Dureau ....................340/347

Primary Examiner—Maynard R. Wilbur
Assistant Examiner—Charles D. Miller
Attorney—Cameron, Kerkam & Sutton

[57] ABSTRACT

Apparatus for providing an absolute indication (that is, an indication which is not lost due to interruption of the supply source) of the position of a movable object, such as a machine tool, by means of a series of binary digital elements extending throughout the range of movement to form a chain-code sequence of dissimilar digital patterns. Each position of the tool is identified in dependence on the particular one of those patterns which is then in registry with a reading head, the identification being in terms of the number of electrical pulses needed to actuate a chain-code generator to produce a similar pattern.

11 Claims, 10 Drawing Figures

MEASURING APPARATUS

This invention relates to measuring apparatus responsive to the position of a first object with respect to a second object.

The invention has particular reference to the numerical measurement of machine-tool movement where the first object is the framework of the machine, acting as a fixed reference structure, and the second object is a movable part, such as the worktable. The invention will accordingly be described in that connection; but it should be understood that the invention is not restricted to such uses.

It is known to obtain such positional information by means of a pulse count which indicates the extent of movement from some reference point. Known arrangements of that kind, unless involving an inconveniently large number of tracks which extend the full length of the movement, do not usually provide an absolute reading, in the sense that any interruption of the energization of the system, such as that due to a noise transient or a short failure of the mains, causes the count to be lost with no "memory" in existence to restore the positional indication after the interruption.

An object of the invention is to provide measuring apparatus capable of supplying in absolute form the sort of positional information above referred to with the use of only two full length tracks.

In accordance with the present invention, measuring apparatus responsive to the position of a first object movable relative to a second object includes a code member secured to the first object and carrying a sequence of binary digital elements which extends in the direction of relative movement and is such that any group of a predetermined number N of consecutive elements differs in pattern from any other group of N consecutive elements, and identifying means.

A staticizor stage, transfer means for transferring to the staticizor stage at any given moment the digital pattern of the particular group which represents the said relative position of the first object at that moment, a code generator operable on pulse energization to set up successive ones of said group patterns, a source for pulse energizing the code generator, comparison means interconnected with the staticizor stage and the code generator so as to respond when their patterns are the same, and output means responsive to said source and the comparison means to derive a measurement signal which represents the relative position of the first object by the number of pulses required to step the generator from a datum pattern until the comparison means responds as aforesaid.

In the accompanying drawings.

Figure 1:
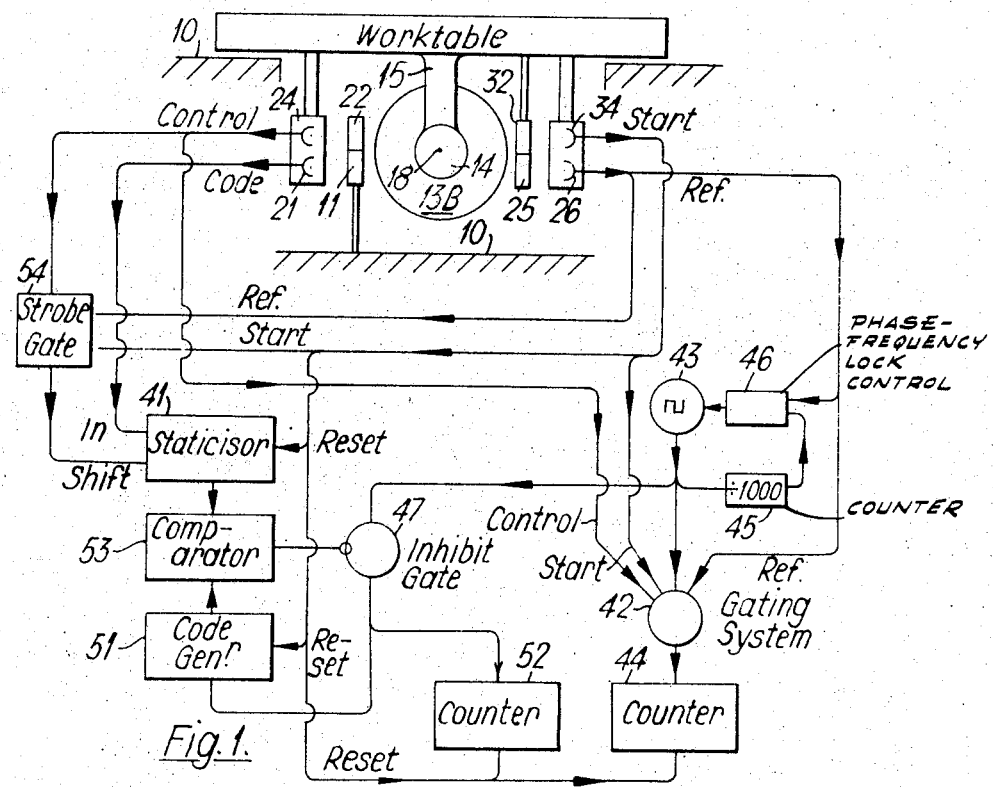
FIG. 1 is a simplified schematic diagram of one embodiment of the invention.
Figure 2:
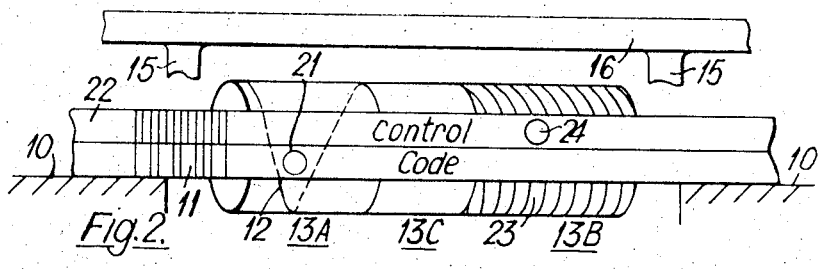
FIGS. 2 and 3 are views taken in the directions II and III of part of the apparatus of FIG. 1, FIGS. 4, 6, 7, 8, and 10 are diagrams of further embodiments.
Figure 3:
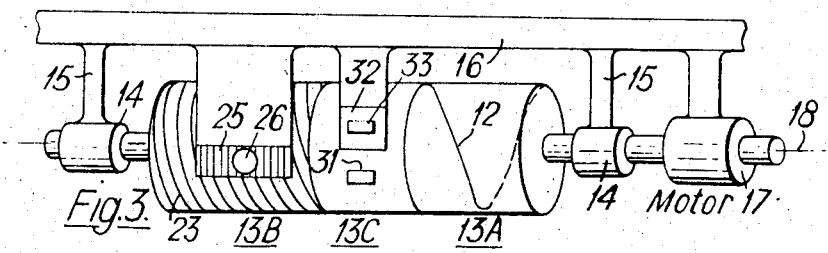

In carrying out the invention in accordance with one form by way of example, see FIGS. 1 to 3, measuring apparatus responsive to the position of the worktable of a machine tool relative to the fixed framework so as to provide an absolute indication of that position includes a code member in the form of an optical grating 11 secured to the framework 10 adjacent to first scanning means in the form of a part-turn helical slot 12 (see FIG. 2) in the otherwise opaque curved surface of a drum 13A. The drum is journalled in bearings 14 (FIG. 3) carried by supports 15 from the worktable 16 to be driven by a motor 17, also secured to the table, about an axis 18 aligned in the direction of movement. This direction is normal to the plane of the paper in FIG. 1 but parallel to it in FIGS. 2 and 3. In FIG. 2, the bearings of the drum are omitted for clarity.

Slot 12 is irradiated by a light source which is within drum 13A. It may conveniently be of tubular form coaxial with the axis 18 of the drum. In FIG. 1 it is concealed by bearing 14 but its position is indicated by the broken circle 19.

Grating 11 is ruled so as to carry a sequence of binary digital elements in the form of parallel straight lines. The sequence extends in the direction of movement, to which the lines are normal, and each digit is represented by the presence or absence of a line. The sequence forms a chain code such that any group of a predetermined number N of consecutive digits differs in pattern from any other such group.

Chain codes and the methods of generating them in electronic form are described in a paper titled "Chain Codes and their Electronic Applications" by Heath and Gribble in Vol. 108, Part C, 1961, of the Proceedings of the Institution of Electrical Engineers.

In the present example N is 14. The patterns are only approximately indicated in FIG. 2. The length of each group or pattern of 14 digits in the direction of movement is such that when a particular group is in register with drum 13A, a part revolution of the drum causes the illuminated slot 12 to scan its pattern, digit by digit in turn, from end to end.

A photoelectric device in the form of a photocell 21 (FIG. 1) is carried by the table 16 and disposed so as to be irradiated by the light from grating 11 when scanned by helical slot 12 and therefore be responsive to the complete pattern of 14 digits as so scanned. In FIG. 2 the position of the photocell 21 is indicated by a half circle.

In operation, therefore, any given relative position of the table and the frame will be uniquely represented within the resolution of the patterns by the particular pattern which is then in register with drum 13A and hence is scanned by the illuminated slot 12 at each revolution of the drum. As a result, the relative position of table and frame is indicated by a series digital signal derived by the photocell, this signal being repeated each time the drum rotates.

In the present embodiment of the invention, that signal is caused to provide a comparatively coarse measurement of the position, over the very wide extent allowed by a 14-digit pattern code. Before the utilization means for deriving this measurement is described, however, further equipment in accordance with the preferred embodiment of the invention for deriving a comparatively fine reading over a comparatively narrow range will be briefly indicated.

A control grating 22 ruled with straight lines at equidistant spacings and substantially normal to the direction of movement is fixed to the frame 10 in register with further scanning means in the form of a multistart helical trace 23 (FIGS. 2 and 3) of reflective material carried on the curved surface of a drum 13B. Conveniently, drum 13B is a continuation of drum 13A and so shares its bearings 14 and the driving motor 17. Illumination of the grating is provided by a light source which is not shown but which is located outside the drum and reaches the grating by reflection from the trace 23.

A control photocell 24 is attached to the table 16 so as to respond to the grating 22 as so irradiated. In FIG. 2 its position is indicated by a circle.

To provide for reference purposes a similar pattern to that supplied by the control grating, a reference grating 25 (FIGS. 1 and 3) ruled similarly to the control grating 22 is secured to the worktable so as to be fixed relative to the drum assembly. It too is illuminated by reflection from spiral trace 23, using the same or a different light source (not shown) to that which irradiates the control grating. A reference photocell 26 is attached to the worktable to respond to grating 25.

Hence in operation, as the drum rotates, gratings 22 and 25 set up cyclic control and reference patterns of relative phase dependent on the relative position of the objects over the length of one cycle; and the corresponding photocells 24 and 26 develop signals of that relative phase.

To define repetitive periods of scan for both the code and control gratings, a drum 13C, conveniently combined with drums 13A and 13B, is provided. Its curved surface carries a slot 31 (FIG. 3) parallel to axis 18 and illuminated from within the drums as is the spiral slot 12. To cooperate with this is a mask 32 attached to the worktable 16 and having a slot 33 similar to slot 31. Outside the mask and also attached to the table is a photocell 34 omitted from FIG. 3 so as not to confuse the drawing. The arrangement is such that the cell is irradiated by the alignment of slots 31 and 33 where the angular position of the composite drum 13A/C is such that slot 12 on drum 13A is about to start scanning the particular chain code pattern then in register with that drum. The signal from cell 34 may therefore be used to effect the required definition of the scan periods; it will be referred to as the start signal.

Suitable arrangements responsive to the code and control signals so as to indicate by a coarse and a fine display the relative position of the table will now be described with further reference to FIG. 1.

The signal derived by the code photocell 21 from the chain code grating 11 as scanned by slot 12 is applied to a 14-bit staticizor stage 41 arranged to store the series signal received from the cell in response to a scan of the pattern then in register with drum 13A. The stage is in the form of a shift register to the Input point of which the signal is applied.

As described later, each scan is initiated by a start-signal pulse from cell 34, indicating that slot 33 in mask 32 has reached alignment with slot 31 in drum 130.

The signals from the control and reference cells 24 and 26 in response to the scanning of gratings 22 and 25 by helices 23 on drum 13B are applied, after amplification and squaring in stages which are not shown, as two of the inputs to a gating system 42. A third input to the gating system is derived from a clock stage 43 supplying pulses at a nominal 1 MHz frequency. A fourth signal is derived from the start signal from photocell 34.

As will also be described later, the function of the gating system 42 is to control the passage of clock pulses from clock 43 to a three-decade counter 44 in dependence upon the relating phase between the control and reference signals from cells 24 and 26.

After division to 1 KHz in a three-stage counter 45, the clock train is applied together with the reference signal from cell 26 to control the clock frequency by means of a phase and frequency locked loop comprising stages 43 and 45 and a further stage 46, so that one cycle of the reference signal coincides with precisely 1,000 clock pulses.

The clock pulses are also applied by way of an inhibit gate 47 to step a 14-bit chain code generator 51 and a four-decade counter 52. The pattern held in stage 51 and that held in stage 41 are applied to a comparator stage 53 arranged to supply a signal to close gate 47 when the respective patterns are the same.

Staticizor 41, code generator 51, pulse source 43, comparator 53 and counter 52, together with transfer means in the form of the arrangements for scanning the code patterns and applying them by way of photocell 21 and subsequent connections to staticizor 41, constitute the identifying means above referred to.

With the rulings of all three gratings at a 1 mm pitch, counter 52 will have a range from 1 to 999 mm and counter 44 a range from 0.999 to 0.001 mm. These are the coarse and fine ranges above referred to.

The code grating 11 and the control gratings 22, as already explained, are both fixed to the tool frame. The respective rulings are so aligned that the corresponding signals are in synchronism, that is to say, so that each cycle of the control signal coincides both in space and time with a digit signal from the code pattern.

This synchronism is made use of to ensure that a well-defined "0" or "1" signal is read from each digit of the code pattern by strobing the output from photocell 21 at the instant when the scanning slit 12 is centered over a line or space of grating 11. The strobing pulses are derived from the positive-going crossovers of the squared control signal from photocell 24 and applied to the shift input of stage 41 by way of a strobe gate 54 under the control of the reference and start signals. As will be appreciated later, it is gate 54 and its controls—in particular that provided by the start signal—which act as the group-selecting arrangements to apply to the staticizor the required pattern group included in the portion of the code member scanned by the drum.

The unambiguous changeover of the coarse digit scale as the fine digit scale changes from 0.999 to 0.000 is attained by ensuring that the start of each scan of the chain code is determined by the first control signal strobe pulse which follows the first positive-going crossover of the reference signal subsequent to the start signal from photocell 34.

This sequence of events at the start of each scan period is regulated by the strobe gate 54. It controls by way of the Shift input to the staticizor the entry of the binary digits from the code pattern in response to the strobe pulses derived from the control signal, and to the scan-start pulses derived from the start and reference signals from cells 34 and 26.

The start signal also serves to reset stages 41 and 51 and the counter 44 and 52.

In describing the operation of this equipment, it will be assumed for convenience that the pattern length N is only four digits, not fourteen. As the number 0000 cannot be used in a chain code, the datum or "0" position of the workpiece is taken to be the pattern 0001. This will be referred to as the zero position or datum pattern. The first few positions, shown as distances in mm from datum, are represented by patterns as follows:

| Position | Pattern |
| --- | --- |
| 0 | 0001 |
| 1 | 0011 |
| 2 | 0111 |
| 3 | 1111 |
| 4 | 1110 |
| 5 | 1101 |
| 6 | 1010 |
| (etc) | |

The last position, 14 mm from datum, is represented by the pattern 1,000.

The action of the chain-code part of the apparatus will be described first.

In the off position of the apparatus it will be assumed that the worktable is at the datum position, with the pattern 0001 on grating 12 in register with drum 13A.

Chain-code generator 51 is designed so that when it is energized it at once sets up the datum pattern 0001.

The motor is switched on and run up to full speed. The first start signal generated is then automatically employed to reset counters and registers to zero and initiate the reading of the code pattern.

The first rotation of drum 13A after the first start signal scans the code grating and delivers to the staticizor 41 the particular pattern 0001 as selected by the start signal by way of gate 54. As this pattern is the same as that in stage 51, comparator 53 closes gate 47 in time to prevent a pulse from the clock from reaching counter 52, which therefore remains indicating "000."

The next start signal is employed to reset stages 41 and 51, restore the counters to zero, and initiate the next scan period.

So long as the table remains in the position corresponding to the pattern 0001, repeated scans of the code pattern by drum 13A after each reset leaves stage 53 holding that pattern, with counter 52 indicating "000" at the end of each scan period.

Suppose, now, that the table moves forward by 1 mm, thereby changing the pattern to 0011. After each start signal has reset all stages, the first revolution of the drum scans this new pattern and delivers it to the staticizor 41. As the code generator 51 has been reset to the datum pattern 0001, the contents of stages 41 and 51 are now dissimilar; accordingly the comparator 53 opens gate 47 to allow a clock pulse to pass from the source 43 to the generator. This has two effects: The first pulse to pass causes generator 51 to be stepped to the pattern "0011," thereby causing gate 47 to close; and counter 52 is stepped to the number "1."

As the table continues to move, this process is continued; at each new position, the first start signal from cell 34 resets the counter 52 and stages 41 and 51. During the ensuing scan period the counter is stepped to that decimal number corresponding to the four-digit binary code at the new code pattern that has been scanned and read into staticizor 41.

Assume, further, that when the table has reached, say, a position 6 mm from datum, represented by the pattern 1010, with counter 52 accordingly holding the number "6" at the end of each scan period, some incident, such as a mains failure, causes the whole equipment to be de-energized.

Its state is then as described above for the off condition, except that the pattern aligned with drum 13A is 1010 instead of 0001.

Though this reversion will have emptied counter 52, the position indication is not lost but is "remembered" by the above-mentioned alignment of pattern 1010 with drum 13A.

Hence as soon as the power is restored, the first start signal resets the counters and stages 41 and 51 and the first rotation of drum 13A re-scans pattern 1010 of grating 11 and so returns it to stage 41. As stage 51 has been reset to the datum pattern 0001, comparator 53 opens gate 47 and keeps open until sufficient clock pulses have stepped stage 51 to pattern 1010. The six pulses needed to do this have also passed to the counter 52, thereby restoring the indication "6."

An absolute indication of the tool position has thus been provided.

The operation is closely similar where the pattern is of 14-digit length, allowing an indication of the tool position form datum to be extended to nearly 10,000 mm—the limit prescribed by counter 52.

The reading thus arrived at is accurate to the pitch of the code grating. The fine-reading part of the equipment operates in reliance on the fact that the space between adjacent rulings of the control grating and hence of the code grating is spanned by one cycle of the control signal; the phase difference between that signal and the reference signal is measurable to a thousandth of that distance as follows later.

As all the relevant stages are reset before each active scan, the apparatus responds with equal effect should the direction of movement be reversed.

To allow for the sudden jump from one code pattern to the next as the table moves, the slot 12 is designed to scan one more digit of the chain code—that is, (N+1) or 15 digits, rather than the 14 of the actual pattern.

If in addition it should be required that the readout from the code scale should be maintained during the movement of the scanning drum, the physical length of the 14-digit code pattern which must be scanned would appear to stretch or contract, depending on the direction of movement of the worktable. Hence the extent of slot 12 in the axial direction must be sufficient to scan the 14 or 15 digits at the fastest required rate of that movement.

Thus, for example, if the apparent velocity component of the slot 12 along the length of the code scale when the table is at rest is V, and the maximum required velocity 0.5V, then the effective scanning velocity of the slot will vary between V−0.5V and V+0.5V—that is to say, the maximum required extent of slot 12—will be 1.5 times that required when the table is at rest.

Where the slot extends arcuately for more than a single turn, it is necessary to use only alternate ones of the start signal to control the group selection by way of gate 54. This is because the start signals occur once per revolution exactly; hence if the slot extends beyond a single turn, the start signal that initiates the readout will be followed by another before the readout is finished. By using only alternate start signals, these second ones are suppressed.

A further advantage of an (N+1) scan is that the provision of an (N+1)th stage in the staticizor and the use for the zero signal of the code pattern digit 1 followed by N digits 0 allows the "filled" condition of the staticizor to be checked; for in such an arrangement the arrival of the digit 1 in that extra stage (as indicated in any convenient manner) shows that the staticizor contained a complete code pattern. It would not be necessary to add an extra stage to the code generator 51: it would still posses only N stages, which the comparator 53 would compare with the original first N stages of the staticizor.

A possible additional advantage of an (N+1) scan could be the availability of the (N+1)th stage to provide a general reset signal, instead of using the start signal for that purpose.

Gate 42 is designed so as to pass the clock pulses through to counter 44 throughout each period defined by the positive-going crossover of the reference signal and the ensuing crossover in that direction of the control signal. The phase difference between them is thus digitized. As already mentioned, the clock frequency is so controlled by the phase and frequency locked loop 43, 45, and 46 that each cycle of the reference signal carries exactly a thousand pulses. If then, for example, the signals are in quadrature, representing a distance equal to a quarter of the grating pitch or 0.25 mm, gate 42 is open long enough to pass 250 pulses to the counter and so produce the correct reading ".250 mm."

This reading is also of an absolute nature, since on the occurrence of a break in the energization, the measurement within a grating pitch will be remembered by the relative positions of gratings 22 and 25; so the first rotation of drum 13B when the energization is resumed will restore the two signals and so allow sufficient clock pulses to pass to the counter to digitize their relative phase.

It is true that this digitized reading will be ambiguous inasmuch that the particular rulings are not identified, but such identification is provided by the comparatively coarse reading of counter 52.

Hence, in operation, the position of the worktable along the considerable length of the code grating is defined to the nearest ruling of that grating by counter 52, while the position between rulings is defined by counter 44—both readings being absolute.

Using 14-bit patterns with gratings of 1 mm pitch, the maximum length of travel, expressed in mm, would be $2^{14}$ less the unusable all-zero pattern and *less* the axial length of drum 13B. This works out at abut 16 meters. As within the whole of that long range an absolute measurement to a thousandth of a mm is readily obtainable as described above (provided that counter 52 has sufficient additional stages of higher significance) the advantage of a measurement system in accordance with this embodiment of the invention is clearly shown.

Stages 42 and 54 may consist of simple arrangements of bistables and gates. Various circuits may readily be devised to suit the equipment available. The code generator 51 may take the form of a shift register combined with suitable logic to generate the required N patterns. Various circuits for this purpose are disclosed in the Heath and Gribble paper above referred to.

Various features of the above-described embodiment may be modified within the scope of the invention. Thus the scanning system may be modified considerably—such as by the substitution for the mechanical device of a rotating drum of a static system in which the scan is effected by lamps sequentially energized in polyphase or a single modulated lamp with multiple cells selected in polyphase.

The light source which irradiates slot 12 would preferably be outside the drum, the slot 12 being replaced by a helix of reflecting material, as are helices 23.

Instead of being normal to the direction of movement, the code lines of grating 11 may slope a little, to match the slope of helix 12.

Figure 4:
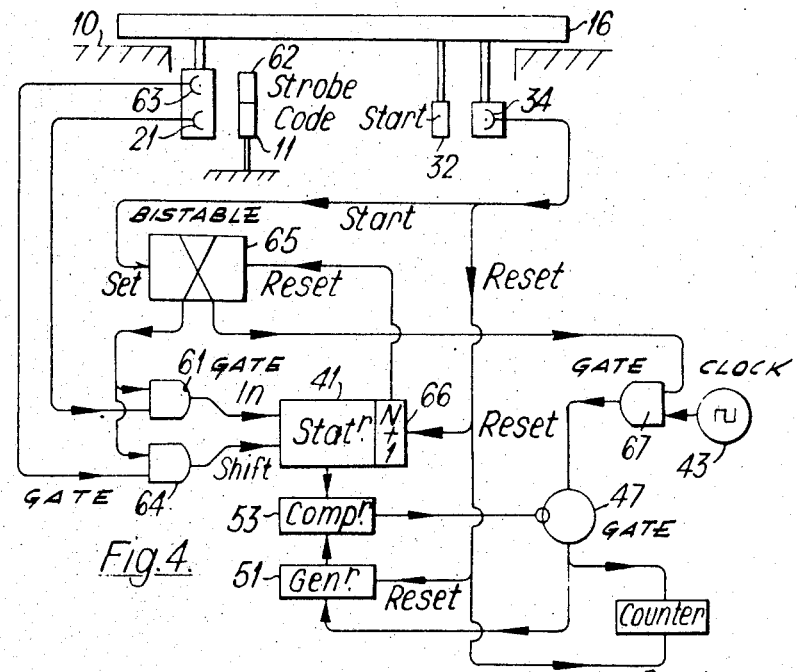

The effective crossovers of the control and reference signals may be the negative-going crossovers, rather than the positive-going.

Where the fine reading is not required, the circuit of FIG. 1 may be simplified as shown in FIG. 4, where the components already referred to are indicated by their previous references.

The drum 13A operates as before in association with the code grating 11 to serialize the code patterns and deliver them to the input point of staticizor 41, this time by way of a two-entry AND-gate 61. The drum itself is not shown.

Of the fine-reading equipment of FIG. 1, control and reference gratings 22 and 25, photocells 24 and 26, and the scanning helical trace 23 of drum 13B are omitted.

Figure 5:
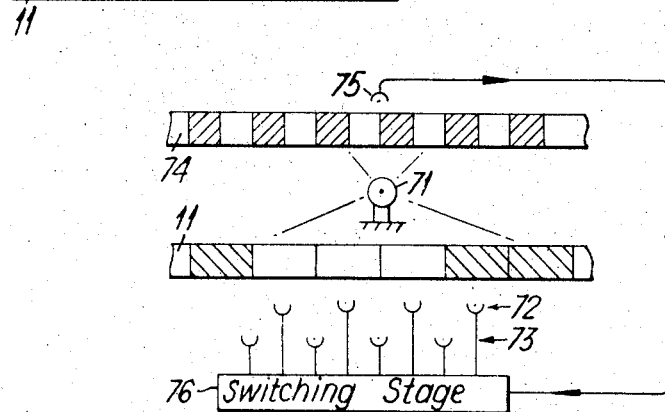
FIG. 5 shows a detail of the embodiment of FIG. 4.

Instead, a track of strobe pulses 62—see FIG. 5—is provided alongside the code track 11 and arranged to be scanned in any convenient manner by the rotating drum to provide from a photocell 63 (FIG. 4) a series of strobe pulses in synchronism with the train of code pulses. These strobe pulses are applied by way of another two-entry AND-gate 64 to the shift input of the staticizor 41.

The other two inputs to gates 61 and 64 are supplied by the Set output of a bistable 65. The stage is switched to that condition by each start signal from cell 34 and reset by a signal from an (N+1)th stage 66 added to the staticizor.

The pulse generator or clock 43 is supplied as before; but this time it is free-running rather than being synchronized to a grating pattern. Its pulses are applied by way of an AND-gate 67 to the inhibit gate 47 and thence to generator 51 and counter 52. The other input to gate 67 is supplied by stage 65 when in its reset state.

The start signal is applied as before to reset stages 41 and 51 and counter 52.

The operation need only be briefly indicated.

Each start signal, in addition to its various resetting duties, sets bistable 65 thereby alerting gates 61 and 64 to pass the serialized code signals and the strobe pulses through to the staticizor. As indicated to a very much exaggerated scale in FIG. 5, the markings of the strobe train are located so that the train, acting by way of the shift input to the staticizor, selects just the center of each code pulse (if any).

With stage 65 in its Set condition, the pulses from clock 43 are blocked at gate 67.

With the arrival of digit 1 at stage (N+1) 66, thereby signalling that the staticizor contains the complete pattern of the code group scanned, bistable 65 is reset, thereby closing gates 61 and 64 and opening gate 67 to pass the clock pulses through gate 47 to generator 51 and counter 52 until the generator contains the same pattern as the staticisor.

As the counter and other stages are reset at each start pulse, the apparatus responds correctly regardless of the direction of movement, as on the embodiment of FIG. 1.

Figure 6:
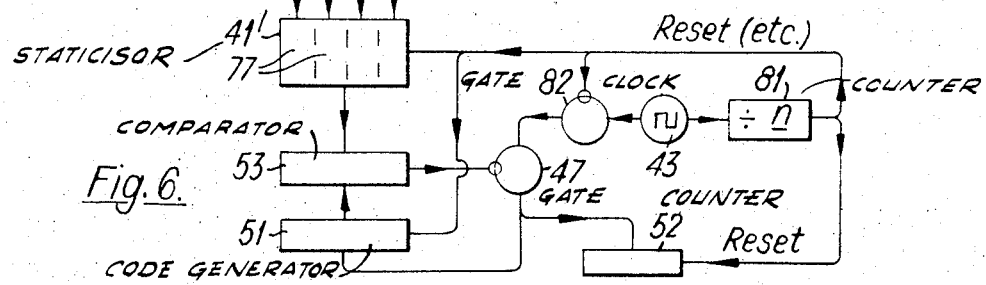

The repetition frequency of the clock pulses should be sufficient to allow the counter to keep pace with the fastest likely movement of the table, but is otherwise not critical.

Where it is not convenient to provide a rotary or other form of repetitive scanner, the transfer means may be modified to transfer the N digits of a group to the staticizor in parallel rather than as a series train. Such an arrangement is shown in FIG. 6.

The code optical grating 11, assumed as before to be fixed to the worktable and carry four-digit patterns, is irradiated by a stationary lamp 71, the light from which is shielded to confine it roughly to the four elements of the particular pattern which represents the position of the table at the particular moment illustrated.

Irradiated by those four elements is a set 72 of four photocells, one for each digit of the pattern. As with FIG. 5, the pattern is depicted to a much exaggerated scale. In practice, where the pattern elements are spaced more closely than is practicable for the cells, the cells may be spaced as convenient and the light conveyed to them from the repetitive code elements by some optical means, such as optical fibers; these are not shown.

In order to avoid errors due to reading the cells when they are half-way between adjacent digital elements rather than aligned centrally on them, a second set 73 of four cells is provided, spaced by half a digit width to the side of set 72. In the drawing, the cells of set 72 are centered on the digits. whereas those of set 73 are half-way between adjacent digits.

To select the set which at any given moment is the more centrally aligned—e.g., set 72 as depicted—a second optical grating track 74 fixed to the worktable is provided. It is similar to track 62 of FIG. 5 and irradiated by lamp 71, or by a separate lamp if more convenient.

Track 74 is read by a photocell 75 the signal from which is applied to control a switching stage 76 by means of which the sets are connected to a staticizor 41$^1$. Cell 75 so controls stage 76 as to select for application to the staticizor at any given moment the particular one of sets which is the more centrally aligned on the code elements at that moment—set 72 in this example.

The staticizor is given the reference 41$^1$ to distinguish it from staticizor 41 of the above described embodiments, as the two are not quite alike in structure. Staticizor 41$^1$ consists of N (four) bistable stages 77 to which the four cells of the selected set are connected. Each stage is arranged to be switched to its Set condition when the cell to which it is connected is reading digit 1 of the code pattern; when the digit that is read is 0, the stage is in its Reset state.

Comparator 53, code generator 51, and counter 52 may be as before, and the pulses for operating the generator and the counter are again derived from a clock 43, connected to stages 51 and counter 52 by way of gate 47. In the absence of a moving scanner, the reset signals are derived from the clock by way of a stage 81 designed to pass every $n$th pulse only; these are applied to reset the generator and the counter. Each is also applied to the staticizor, where it causes the stages 77 to read the pattern represented by whichever set of photocells is switched through by stage 76.

The pulses subsequent to each $n$th pulse drive the code generator 51 and counter 52 much as in the previously described embodiments until the pattern in the generator matches that in the staticizor; whereupon the comparator blocks gate 47.

To prevent the $n$th pulses reaching the generator and the counter, a further inhibit gate 82 is inserted between the clock and gate 47 and arranged to be closed during each $n$th pulse.

As in the arrangement of FIG. 4, the clock is free running. The frequency and the value of $n$ should be such as to allow all the four possible code groups to be set up in turn in generator 51 before the fastest likely movement of the worktable has brought the next code group to the read position—in other words, in the present example, before the table has moved sufficiently for the cells of set 73 to be more centralized than those of set 72 and so ready to be switched to the staticizor.

Further description of the operation is hardly necessary. As the table moves steadily in one direction, the photocell sets 72 and 73 are alternately switched through to the staticizor. During the brief interval throughout which a set is so switched, an $n$th pulse from the clock causes the stages 77 to take up the conditions representing the digits seen by those cells. The ensuing pulses bring stage 51 to duplicate the pattern in the staticizor and enter the appropriate number of pulses into the counter. The clock runs quickly enough to have finished this process before the other set of cells is brought to the read position.

Figure 7:
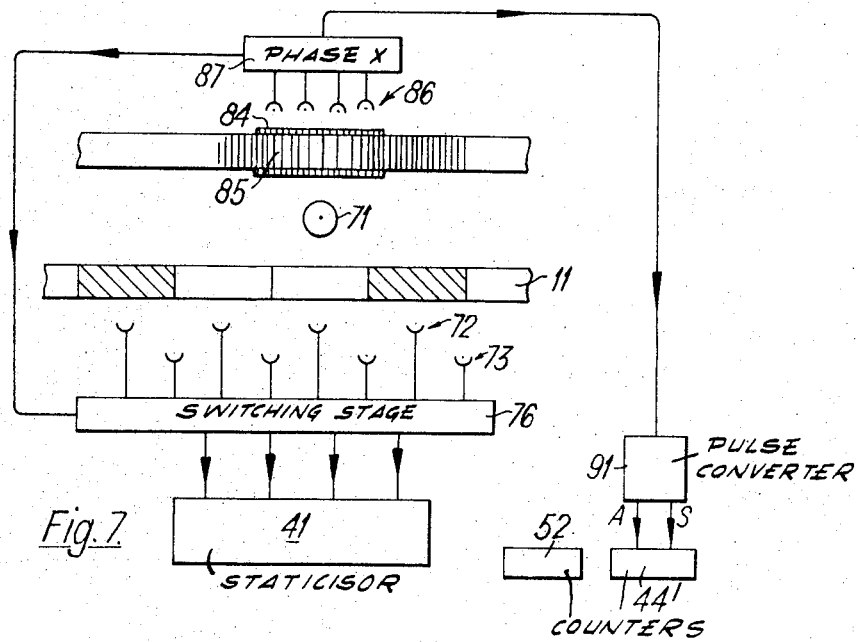

As the counter and generator are reset before each pattern is read, the apparatus responds equally should the direction of movement be reversed.

Where it is desired to supplement the reading derived from the code track, the arrangement of FIG. 6 may be modified as shown in FIG. 7.

Here the grating 74 of FIG. 6 is replaced by a grating 83 which, like grating 11, moves with the workpiece and which produces in combination with a short fixed index grating 84 a cyclic pattern 85 of wavelength equal to the pitch of code grating 11 and illumined by the lamp 71.

To respond to pattern 85, apparatus similar to that described with reference to FIG. 1 of U.S. Pat. No. 3,449,743 may conveniently be employed. Briefly, this includes a bank 86 of four photocells located to respond to the pattern at 90° spacings. After phase multiplication in a stage which in FIG. 7 is indicated by the block 87, which as described in that specification takes the form of a ring potentiometer, the photocell signals are converted into pulse form by a stage 91 and applied over Add/Subtract leads A and S to a counter 44¹, corresponding to counter 44 of FIG. 1.

As described in the above-mentioned specification the arrangement is such that for each cycle of pattern movement, 10 pulses are applied to the counter, to be added or subtracted in accordance with the direction of movement. Hence the reading provided by counter 44¹ sub-divides by 10 the reading provided by counter 52.

As the signal derived in stage 87 is responsive to the movement of the code track 11 as well as to the movement of track 83, it can be used to provide what timing control in dependence on the worktable movement is required by the code identifying part of the equipment.

Thus track 74 and photocell 75 may be dispensed with and the signal for controlling the switching stage 76 derived instead from the appropriate phase point in stage 87.

The remainder of the equipment of FIG. 7, concerned with the measurements derived from the code scale, may be as in FIG. 6 and is therefore not shown.

Figure 8:
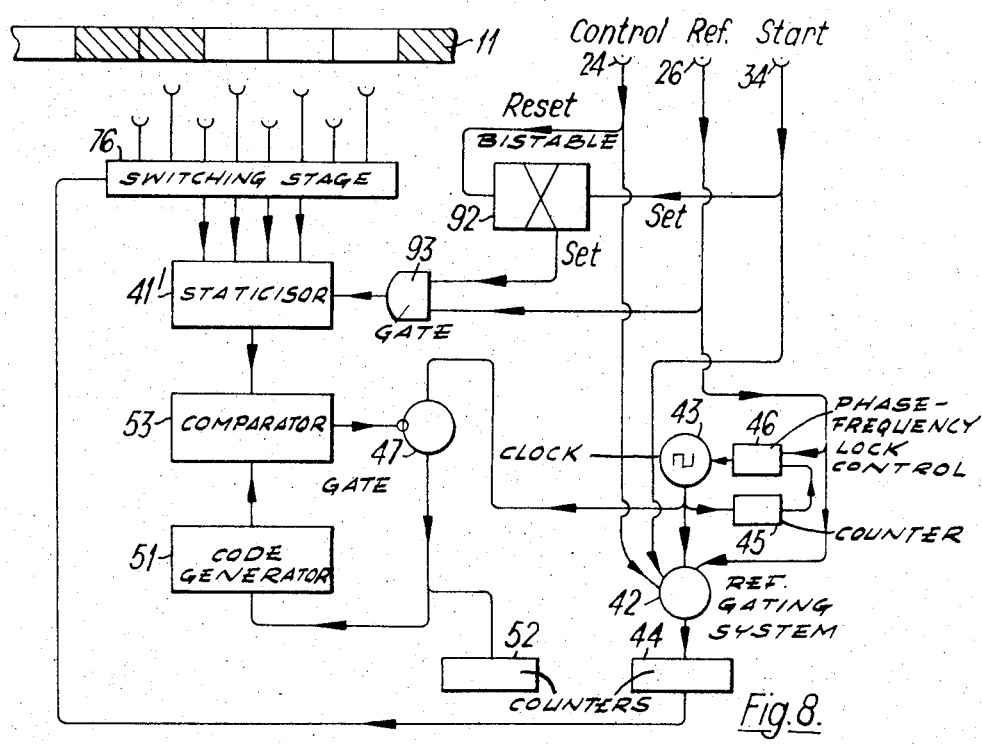

If a more accurate measurement to supplement that from a code measurement of the parallel read-out kind, as described with reference to FIGS. 6 and 7, is required, it may be necessary to use a dynamic system. This may be as shown in FIG. 8.

Control, reference, and start signals are derived by photocells 24, 26, and 34 as in the arrangement of FIG. 1, the drum and associated gratings being omitted to simplify the drawing. From those signals, the pulses for counter 44 may also be derived as in the FIG. 1 arrangement. Here again, these more accurate signals may be used to control the timing of the code identifying apparatus. In this example, the clock 43, which is free-running in the embodiment of FIG. 6, is controlled by the reference signal as in the embodiment of FIG. 1.

Similarly the control of switching stage 76 to select the appropriate set of photocells is exercised by a signal derived from the 0.5 digit stage of counter 44 and which consequently occurs twice in each code group.

Again, the signal which transfers to the staticizor 41¹ the group reading derived by the active set of photocells is supplied by the first reference pulse which follows a start pulse.

To derive this transfer signal, each start pulse is applied to set a bistable 92, thereby alerting an And gate 93 to pass to the staticizor the next reference pulse, the staticizor is reset by the next control pulse.

Other resetting operations may be derived, as before, by the start signal.

It is not necessary for the staticizor and code generator to be separate stages; they may be combined in the one unit, and the measurement derived from the number of pulses required to step the generator from the staticized pattern to the datum pattern, instead of in the other direction as in the embodiments so far described.

The principle of operation is that, during each readout (which for the moment is assumed to be of the serial kind), the unit is arranged to act as a shift register, operating from a datum pattern such as 0001. On completion of readout (which may be identified by the entry of digit 1 into an (N+1)th stage as above described) the unit is converted by a switching operation into a code generator, while retaining the staticized code pattern. This generator pulsed back to the datum pattern by the same sort of clock pulses as actuated generator 51, these pulses being also passed to a counter. The return of the unit to the datum pattern is detected by the comparison means; this in effect compares the actual state of the unit with the datum state and arrests the flow of pulses when they are equal.

The number of pulses needed to effect this restoration represents the code group that is scanned.

All that the changeover does is to reconnect the bistable stages of the register to one another, adding appropriate feedback, to form a code generator appropriate to the value of N.

Figure 9:
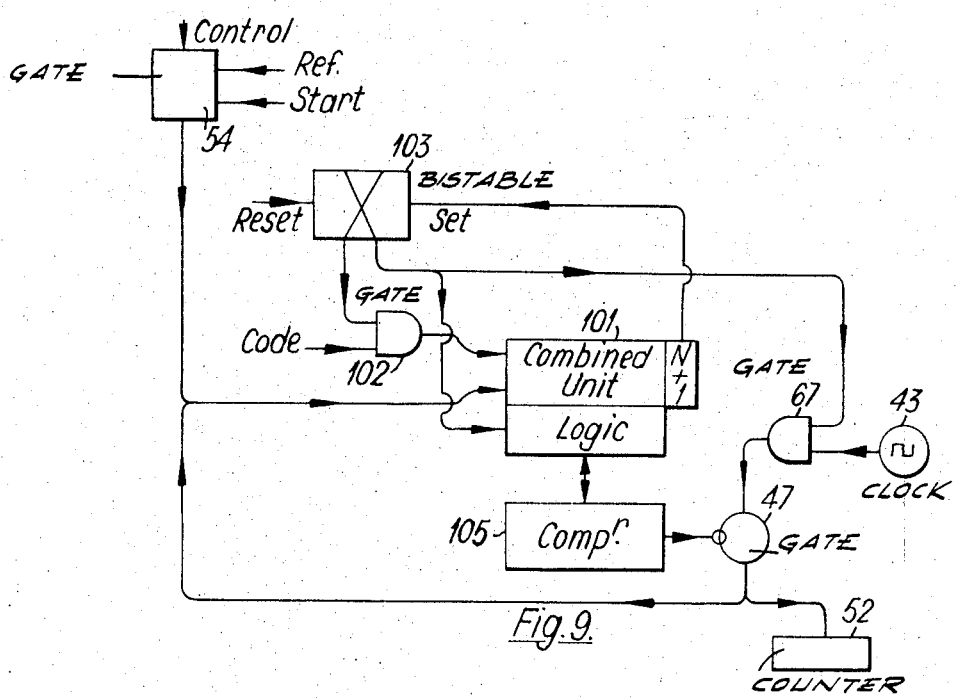
FIG. 9 shows an alternative arrangement of a part of the embodiments above mentioned.

An arrangement switched to the particular embodiment of FIG. 4 is shown in FIG. 9.

The combined unit, with its (N+1)th stage, is indicated at 101. Associated with it is a logic network 104, designed to effect the necessary switching.

The code pulses are applied, to what is the input of the unit when connected as a shift register, by way of an AND-gate 102 arranged to be alerted by a bistable 103 when in its reset state. In its set state, stage 103 alerts gate 67 between the clock 43 and inhibit gate 47, from which the pulses pass to the counter 52 and to the shift input to unit 101. The signal to set stage 103 is derived from the (N+1)th stage of the unit.

The function of the unit is determined by logic network 104 actuated by a function signal from bistable 103 so as to connect the unit as a shift register when stage 103 is in its reset state but as a code generator when stage 103 is in its set state.

The actual condition of the unit is compared by some comparison means 105 (which may include a simple diode network) with the datum condition, and which acts to block gate 47 when the datum condition is reached.

Stage 103 is reset by the start pulses.

In operation, at the start of a scan, stage 103 is in its reset state, thereby acting through logic network 104 to connect the unit to function as a shift register and alerting gate 102 to allow the code pulses to pass into the register in synchronism with the strobe pulses from gate 54 on the shift input. During this process, stage 103 maintains gate 67 closed, to block the clock pulses.

When the entry of the code signal is complete, the resulting actuation of the (N+1)th stage switches stage 103 to its set state. Acting by way of the logic network, stage 103 converts the unit to its code-generating function, and at the same time allows the clock pulses to pass through gate 67 to actuate the code generator by way of its shift input. The return to datum is detected by stage 105, which arrests the flow of pulses at gate 47.

In systems employing a parallel code readout, such as shown in FIG. 6, the arrangement may be much the same in principle. About the only difference of importance is that, in the absence of a (N+1)th stage, the function determining signal has to be derived in another manner—perhaps by using the trailing edge of each Nth pulse, after it has caused the photocell reading to be transferred to the staticizor.

Figure 10:
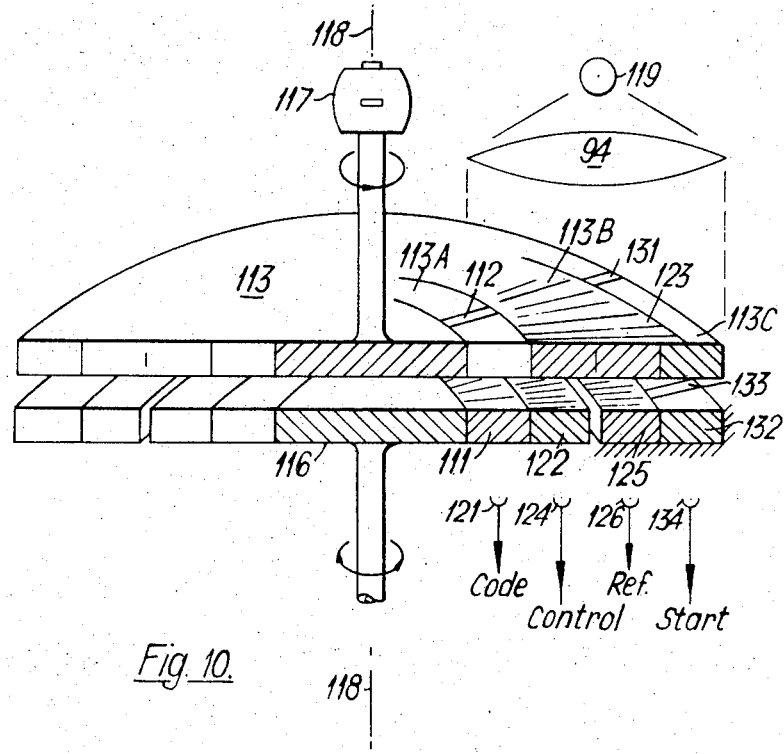

As shown in FIG. 10, the rotary scanning drum 13 of the arrangement of FIG. 1 may be replaced by a partly transparent disc 113 rotated by a motor 117 about an axis 118 and carrying circular tracks 113A, 113B, and 113C.

In this description, components corresponding to those of FIG. 1 are identified by their previous reference numbers with 100 added.

Disc 113 cooperates with a partly transparent disc which is given the reference 116 because it is rotated about axis 118 with the workpiece (not shown, but corresponding to the worktable 16 of FIG. 1) or other object the movement of which is to be measured.

Disc 116 carries circular tracks 111 and 122. Coaxially outside it are annular tracks 125 and 134, which are fixed.

The discs are illuminated by a lamp 119 the beam from which is collimated by a lens 94 to be projected through the discs and annuli to a bank of photocells 121, 124, 126, and 134.

The track 113A is opaque except for a single transparent radial slot 112 (corresponding to the helical slot 12 of FIG. 1) which as disc 113 rotates, scans the chain code in the form of a radial grating on track 111.

Track 113B carries a continuous uniformly spaced radial grating 123 to scan a moving control grating on track 122 and a fixed reference grating on track 125.

Track 113C is opaque except for a single transparent slot 131 to generate a start signal when aligned with a transparent slot 133 in the otherwise opaque track 132.

The operation of this scanner will be readily apparent owing to the close analogy with the scanner of FIG. 1.

Various features of the above-described embodiments may be varied within the scope of the invention.

For example, the scanning means need not necessarily be a rotating drum or disc, but could be derived from a cathode-ray tube in the well-known flying-spot manner.

Nor is it essential for the code member to be of an optical nature: the code pattern could alternatively be of an inductive nature—such as a magnetic pattern along a tape. This particularly applies to such parallel readout systems as that of FIG. 6, where the patterns 11 and 74 could be in magnetic form along tape and the photocells replaced by magnetic pickoffs of the fluxgate type, suitable for reading stationary tracks.

Or the pattern may be of a capacitive or even a mechanical kind.

What we claim is:

1. Measuring apparatus responsive to the position of a first object movable relative to a second object including a code member secured to the second object and carrying a sequence of binary digital elements which extends in the direction of relative movement of said second object with respect to said first object and forming a chain code and is such that any group of a predetermined number N of consecutive elements differs in pattern from any other group of N consecutive elements, and identifying means located to respond to said elements and operable at any relative position of the objects within the resolution of the patterns to derive a measurement signal which identifies that position in terms of a particular one of said groups said identifying means including a register, transfer means located to respond to said elements by transferring to the register the digital pattern of the particular group of elements which at any given moment represents the said relative position of the first object at that moment, a code generator operable on pulse energization to generate successive ones of said group patterns, a pulse source connected to pulse-energize the code generator, comparison means interconnected with the register and the code generator so as to respond when their patterns are the same, and output means responsive to said source and the comparison means to derive the said measurement signal from the number of pulses applied to energize the code generator to cause the comparison means to respond when their patterns are the same.

2. Apparatus as claimed in claim 1 wherein the output means includes a counter and connecting means for applying to said counter pulses from said source until the comparison means responds as aforesaid, whereby the number held in the counter at any given moment represents the said relative position at that moment.

3. Apparatus as claimed in claim 1 where the code member is an optical grating ruled to represent said patterns and wherein the transfer means includes scanning means movable with the second object and operable at any relative position of the objects within the resolution of the patterns to irradiate digit-by-digit in turn a portion of the code member including the particular one of said groups which represents that position, a photoelectric device disposed to be sequentially irradiated by said portion as scanned and represent it by a series train of at least said number of digital signals, and group-selecting arrangements for applying to the register the N digital signals representing said particular group.

4. Apparatus as claimed in claim 4 including a further optical grating to enable said scanning means to derive a pulse for strobing the digital signals derived from the code member so as to pass to the register only an approximately central part of each such digital signal.

5. Apparatus as claimed in claim 3 wherein to supplement the said measurement signal there is provided control and reference optical gratings secured to the first and to the second object respectively, further scanning means movable with the second object and operable in synchronism with the first-mentioned scanning means to irradiate those gratings so as to set up similar cyclic control and reference patterns of wavelength proportional to the pitch of the code elements and of relative phase dependent on the relative position of the objects, control and reference photoelectric devices disposed so as to be irradiated by light from those patterns, means responsive to the relative phase of the control and reference signals from those devices to indicate the relative position of the objects within the space between adjacent ones of said digital elements, and means for causing the control signal to strobe the digital signals derived from the code member so as to pass to the register stage only an approximately central part of each such digital signal.

6. Apparatus as claimed in claim 1 wherein the transfer means includes
a set of N pickoff devices disposed to respond to the N digital elements of the particular pattern which represents the said relative position of the first object,
and connection means for applying the outputs from said N pickoff devices to the register.

7. Apparatus as claimed in claim 6 which includes
a further set of N pickoff devices disposed to respond to said elements but displaced by half a pitch of said elements from the set first mentioned,
a switching stage for selectively connecting said sets to the register,
and means for controlling the switching stage so as to connect to the register at any given moment the particular one of said sets that is the more centrally aligned on said elements at that moment.

8. Apparatus as claimed in claim 6 where the code member is an optical grating, wherein the pickoff devices are photoelectric devices and means are provided for irradiating the code member to enable the devices to respond to said elements.

9. Apparatus as claimed in claim 7 wherein to supplement the said measurement signal there is provided
means for providing control and reference cyclic signals of wavelength proportional to the pitch of the code elements and of relative phase dependent on the relative position of the objects,
means responsive to the relative phase of said cyclic signals to indicate the relative position of the objects within the space between adjacent ones of said elements,
and means for deriving from those signals at least one signal to control the timing of the said identifying means.

10. Apparatus as claimed in claim 1 wherein the register and the code generator form a combined unit, and further including
a logic network interconnected with the unit to condition it to function either as a shift register or as a code generator.
means for actuating the logic network after the response of said transfer means to convert the unit from a register to a code generator whilst retaining the registered code pattern,
said comparison means being interconnected with the unit to compare the condition of the unit with a datum condition thereof and respond as aforesaid on receipt by the unit of sufficient of said pulses to restore the generator to that datum condition,
and means for actuating the logic network to restore the unit to function as a register before the next response of the transfer means.

11. Measuring apparatus responsive to the position of first object movable relative to a second object including
a code member secured to the second object and carrying a sequence of binary digital elements which extends in the direction of relative movement of said second object with respect to said first object forming a chain code and is such that any group of a predetermined number N of consecutive elements differs in pattern from any other group of N consecutive elements, and identifying means including a combined shift register and code generator unit, a logic network interconnected with the unit to condition it to function either as a shift register or a code generator, transfer means located to respond to said elements by transferring to the unit when conditioned as a shift register the digital pattern of the particular group of N elements which at any given moment represents the said relative position of the first object at that moment, means for actuating the logic network after the response of said transfer means to convert the unit from its register condition to its code generator condition whilst retaining the registered code pattern, a source connected to supply pulses to step the unit when in its code generator condition so as to restore the patterns to a datum pattern, output means responsive to said source to derive a measurement signal which represents the relative position of the first object by the number of pulses required to step the code generator from the registered pattern to the datum pattern, and means for actuating the logic network to restore the unit to its register condition before the next response of the transfer means.

* * * * *